United States Patent
Yang

(10) Patent No.: US 7,505,675 B2
(45) Date of Patent: Mar. 17, 2009

(54) CIRCUIT AND METHOD FOR PLAYING BACK DATA IN A DISPLAYER

(76) Inventor: Wen Ho Yang, No. 255, ChungShan Road, TaoYuan City, TaiYuan County (TW)

( * ) Notice: Subject to any disclaimer, the term of this patent is extended or adjusted under 35 U.S.C. 154(b) by 856 days.

(21) Appl. No.: 10/863,259

(22) Filed: Jun. 9, 2004

(65) Prior Publication Data

US 2004/0247297 A1    Dec. 9, 2004

(30) Foreign Application Priority Data

Jun. 9, 2003    (TW) .............................. 92115519 A

(51) Int. Cl.
H04N 5/76    (2006.01)
H04N 7/00    (2006.01)
(52) U.S. Cl. .......................................... 386/95; 386/46
(58) Field of Classification Search ...................... 386/1, 386/45–46, 95–96, 125–126
See application file for complete search history.

(56) References Cited

U.S. PATENT DOCUMENTS 5,815,631 A * 9/1998 Sugiyama et al. ............. 386/46
7,292,769 B2 * 11/2007 Watanabe et al. ............. 386/46

* cited by examiner

*Primary Examiner*—Thai Tran
*Assistant Examiner*—Nigar Chowdhury
(74) *Attorney, Agent, or Firm*—Bacon & Thomas, PLLC

(57) ABSTRACT

The present invention provides a circuit and method for playing back digital data in a displayer, which is used to reduce the power consumption of a computer host, and by configuring a digital playback circuit in the displayer to make the video data itself being directly played back with the displayer. Thus, even the CPU of the computer host is not energized, the user himself still can operate the display to achieve the playing back of the digital video data, so that the user still can obtain different playing back interfaces to reduce the power consumption of computer host, and minimize the possible loss of computer working time.

14 Claims, 7 Drawing Sheets

CIRCUIT AND METHOD FOR PLAYING BACK DATA IN A DISPLAYER

BACKGROUND OF THE INVENTION (A) Field of the Invention

The present invention relates to a circuit and method for playing back digital data in a displayer; and, particularly, the present invention is a circuit and method for playing back digital data for reducing the power consumption of computer system, and allowing the displayer itself playing back video data.

(B) Description of Related Art

The current computer systems, including the portable computer, all regard the CD-ROM as a standard peripheral for data reading device and/or digital video data playing back device. The typical computer system requests the central processor unit (CPU) being completely connected to read the playing back CD-ROM or the video data in the hard drive. For the current computer architecture, the playing back of video data in the computer still can control the peripheral equipment to play back through the operation system inside the computer and the common power supply. In other words, if the user wants to play back the video data through the CPU or CD-ROM, he has to turn on the whole computer, and maintains a certain power supply to the motherboard and other peripheral equipment. At this time, the motherboard and other peripheral equipment, such as hard drive, keyboard and displayer, etc., will naturally consume a certain level of power. Moreover, the current newer types of computers provide the so-called sustaining mode, for example the power-saving mode entered by the computer not used for another period of time. But, this type of sustaining mode can make the CD-ROM and other components in the computer being power off simultaneously, and also make the peripheral equipment of the computer system having the function of playing back video data alone.

Thus, in the conventional computer system, when the user conducts the operation of playing back video data, he still has to turn on the whole computer, and then execute the operation system (OS) through starting the Basic Input/Output System (BIOS), and play back the video data through the CPU or CD-ROM. Nevertheless, the starting of the peripheral equipment will cause unnecessary power consumption. Especially for the portable computer, the situation of power consumption will be more obvious.

SUMMARY OF THE INVENTION

In the prior art, when the user wants to use the computer system to play back the video data, he still has to execute the booting-up procedure to start the central processing unit (CPU), and supply the power to the associated peripheral equipment. But, the peripheral equipment will cause excess power consumption, and the complicated booting-up procedure will also cause the inconvenience of operation and the waste of time for the user.

Thus, the object of the present invention provides a circuit and method for playing back digital data in a displayer, so that the displayer still can play back the digital data of voice, electric picture image and digital dynamic video/audio at the state of which the CPU of a computer host is not energized.

Another object of the present invention is to provide a circuit and method for playing back digital data in a displayer, so that a computer system can be provided with different interfaces to play back the video data to reduce the power consumption of the computer system and minimize the possible loss of working time.

Another object of the present invention is to provide a displayer with digital playing back, so that an user can directly select and control video data from the displayer without using a CPU and other peripheral devices.

Another object of the present invention is to provide a circuit and method for playing back digital data in a portable computer, which can extend the playing back time of video data on the computer and reduce the power consumption of the portable computer, and minimize the extra requirement of the software driver.

Another object of the present invention is to provide a computer system with a displayer for digital playing back, which can provide different user interface and the playing back method for video data.

Another object of the present invention is to provide a circuit and method for playing back digital data in a displayer, so that the user of the portable computer can choose among different user interfaces of video/audio playing back.

Another object of the present invention is to provide a displayer with digital playing back, which provides different reading interface for video data for the users, and without occupying the host memory, the storage device or the CPU.

The present invention provides a digital playback circuit, which is to combine a digital playing back circuit at a displayer. The playback circuit has a data inputting interface, and includes a digital signal processor (DSP), so that an user can use the data inputting interface to input the video data, and after the further encoding/decoding on the video data by the digital signal processor, the data will be transmitted to the displayer for further playback. Thus, the user can achieve the real-time and convenient video/audio playing back.

In a preferred embodiment according to the present invention, the digital playback circuit of the displayer according to the present invention includes a data inputting interface for reading the video data inputted from outside; a digital signal processor, connected to the output of the data inputting interface, for decoding/encoding the video data inputted from the data inputting interface and generating the video/audio signal; a signal bus for outputting the video/audio signal after encoding/decoding by the digital signal processor; and, an user interface, connected to the digital signal processor, for controlling the playing back of the video data.

Wherein, the digital playback circuit further includes a read only memory (ROM), connected to the input of the digital signal processor, for storing the driver of the digital signal processor.

Wherein, the digital playback circuit receives a memory module from the data inputting interface, and the memory module is used as the access media for the video data.

Wherein, the signal bus of the digital playback circuit is connected to the multiplex interface module, such as the Universal Serial Bus (USB) interface or the speaker.

Wherein, the digital playback circuit is connected to a power supply controller, and the power supply controller is configured at a host, and controlled by a control signal outputted by the digital playback circuit, for controlling a power whether to be supplied to a CPU.

Wherein, the control signal is triggered by a corresponding control key configured at the displayer.

Wherein, the data inputting interface is an embedded or external card reader.

Wherein, the signal bus is an AV terminal wire.

Wherein, the user interface is a control panel.

Wherein, the memory module is a data storage medium, such as CF (Compact Flash) card, SD (Secured Digital) card or MMC (Multi-media Card), MS (Memory Stick), SM (Smart Media) card, USB (Universal Serial Bus) card, and MD (Micro Drive).

Wherein, the data inputting interface is a composite slot for reading the data from the above-mentioned different data storage media.

DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DESCRIPTION OF THE PREFERRED EMBODIMENTS

Figure 1:
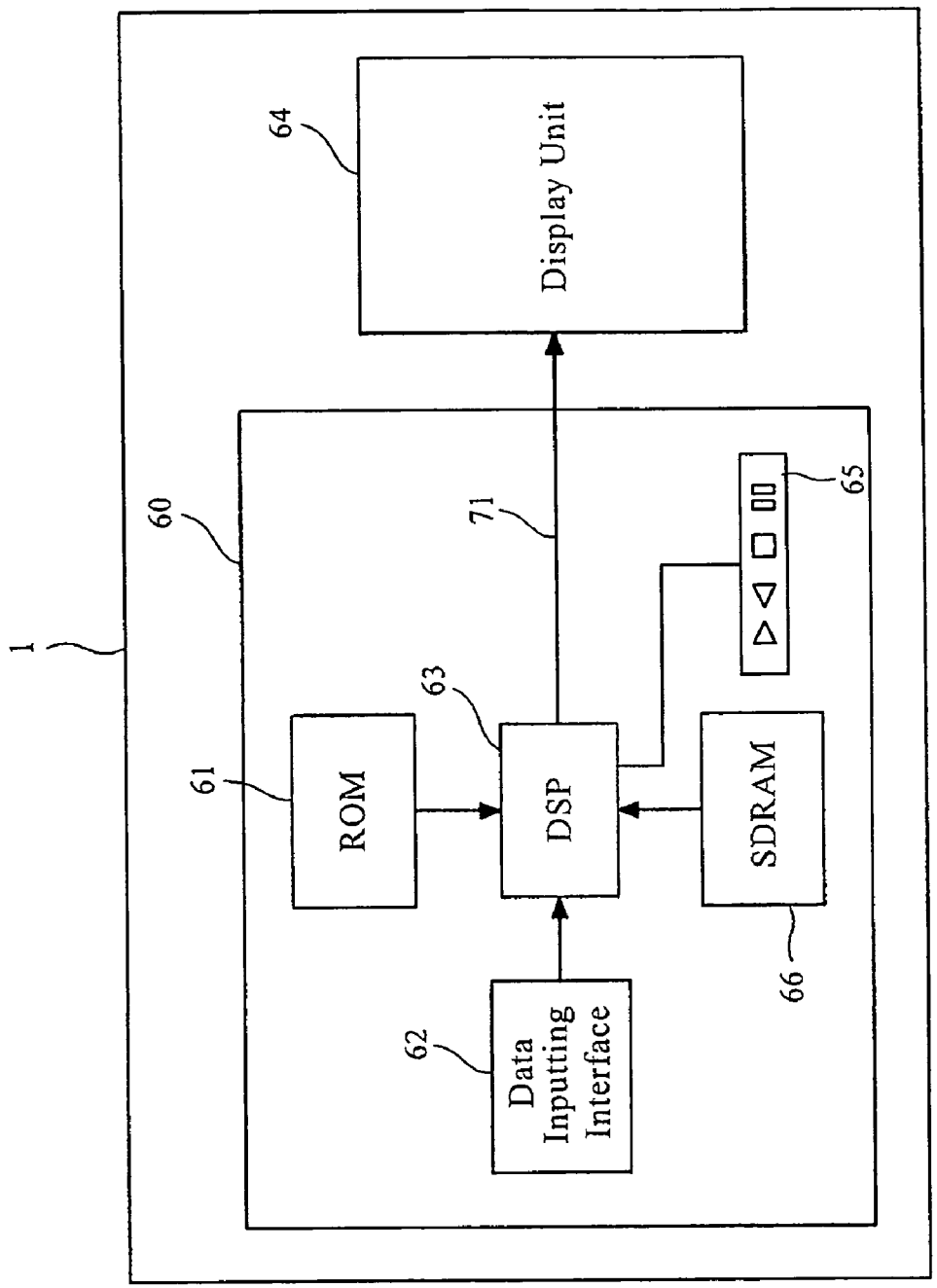
FIG. 1 is a block diagram of a first embodiment of the circuit for digital data playing back in a displayer according to the present invention.

Referred to FIG. 1, the diagram illustrates a block diagram of the first embodiment for the digital playback circuit in the displayer according to the present invention. As the digital playback circuit 60 for the displayer 1 according to the present invention shown in FIG. 1, the displayer 1 includes a display unit 64. The digital playback circuit 60 comprises a data inputting interface 62 for reading the video data from the outside; a digital signal processor 63, connected to the output of the data inputting interface 62, for decoding/encoding processes of the video data; a signal bus 71 for outputting the video/audio signal after encoding/decoding by the digital signal processor 63; an user interface 65 for inputting the control key signal to the digital signal processor 63 to control the playing back of the video data; and, a read only memory 61 for storing the driver of the digital signal processor 63;

wherein the digital playback circuit 60 further includes a Synchronous Dynamic RAM 66 (SDRAM) as the storage medium of the video data accessed by the digital signal processor 63; and, the user interface 65 is composed of a plurality of control keys, in which these control keys include a playback key, a pause key, a stop key, a forward key or a reverse key, and so on, but not limited to these keys.

In the preferred embodiment according to the present invention, the image displayer 1 includes a speaker and a microphone, and receives the video and audio signal from the computer host (not shown in FIG. 1). The display unit 64 not only directly receives the video signal from the computer host, but also may receive the second video input source, which comes from the video signal outputted by the signal bus 71 from the digital playback circuit 60, i.e. an AV signal.

Figure 2:
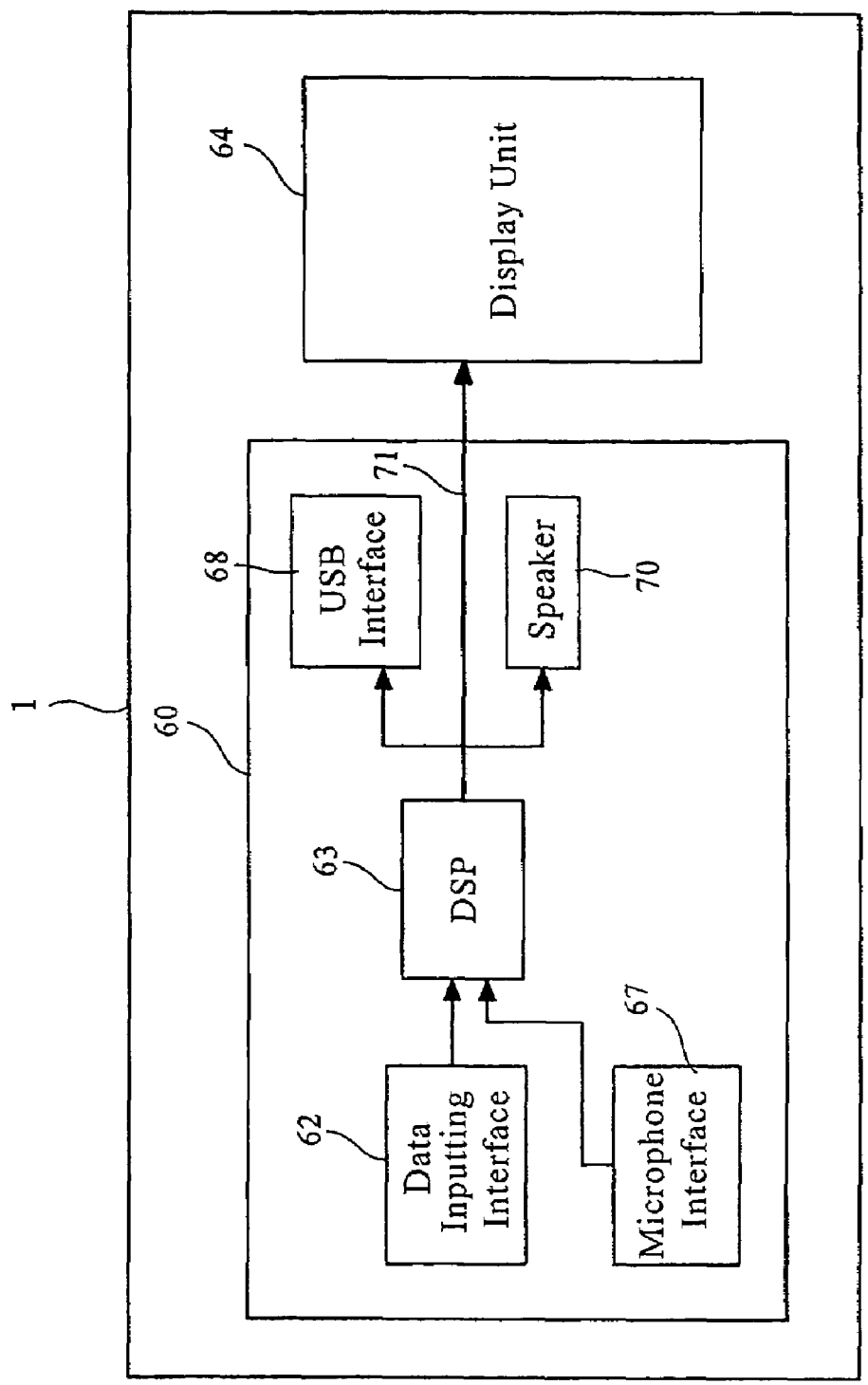
FIG. 2 is a bock diagram of a second embodiment of the circuit for digital data playing back in a displayer according to the present invention.

Referred to FIG. 2 in connection with referring to FIG. 1, the drawing shows a block diagram of the second embodiment for the digital playback circuit in the displayer according to the present invention. The implementation block diagram as shown in FIG. 2 is approximately the same as the FIG. 1, only that the signal output of the digital signal processor 63 can be further connected to the interface modules, like the USB (Universal Serial Bus) interface 68 or the speaker 70. Moreover, the input of the digital signal processor 63 can also be configured with a microphone interface 67 for receiving the voice inputted from the outside, and transmitting to the associated output device through the encoding/decoding process by the digital signal processor;

wherein, the digital signal processor 63 uses the USB interface 68 to communicate with the computer host, so that the digital playback circuit 60 may further output the data read from the data inputting interface 62, or receive the data from the computer host to become a part of the data transmission medium at the computer host. When the user inputs the voice from the microphone interface 67, the digital signal processor 63 may process the inputted voice signal with the MPEG Layer 3 (MP3) standard to output or store, in which the voice signal is stored in a compressed format, and is stored to the memory module from the data inputting interface 62 with the operation capability of the digital signal processor 63, or outputted to the computer host through the USB interface 68. Thus, the computer host can use the decompression method with software to listen to the music, and can also correspondingly output the output signal to a speaker 70 to play back the voice signal.

In the embodiment according to the present invention, the data inputting interface 62 may be an USB interface, so that the digital playback circuit 60 can access a portable storage device with USB interface; or, the data inputting interface 62 may be an integrated card reader, which can simultaneously read the CF (Compact Flash) card, the SD (Secured Digital) card, the MMC (Multi Media Card), the MS (Memory Stick) card, the SM (Smart Media) card, the USB (Universal Serial Bus) card, and the MD (Micro Drive), and the like.

According to the embodiments shown on FIG. 1 and FIG. 2, the digital playback method in a displayer according to the present invention implemented in a displayer includes the following steps: providing a data inputting interface for reading the video data inputted from the outside; providing a digital signal processor for decoding/encoding the video data; providing a playback control key interface for controlling the video/audio playback of the digital signal processor; and, providing the video/audio signal to a display unit and a speaker.

In a further embodiment according to the present invention, the digital playback circuit 60 is connected to a power supply controller. The power supply controller is configured at the computer host, and the power supply controller is controlled by a control signal outputted from the digital playback circuit for controlling the host power whether to be supplied to the central processing module to start the computer host. The control signal can be outputted from the digital signal processor triggered by a control key.

Figure 3:
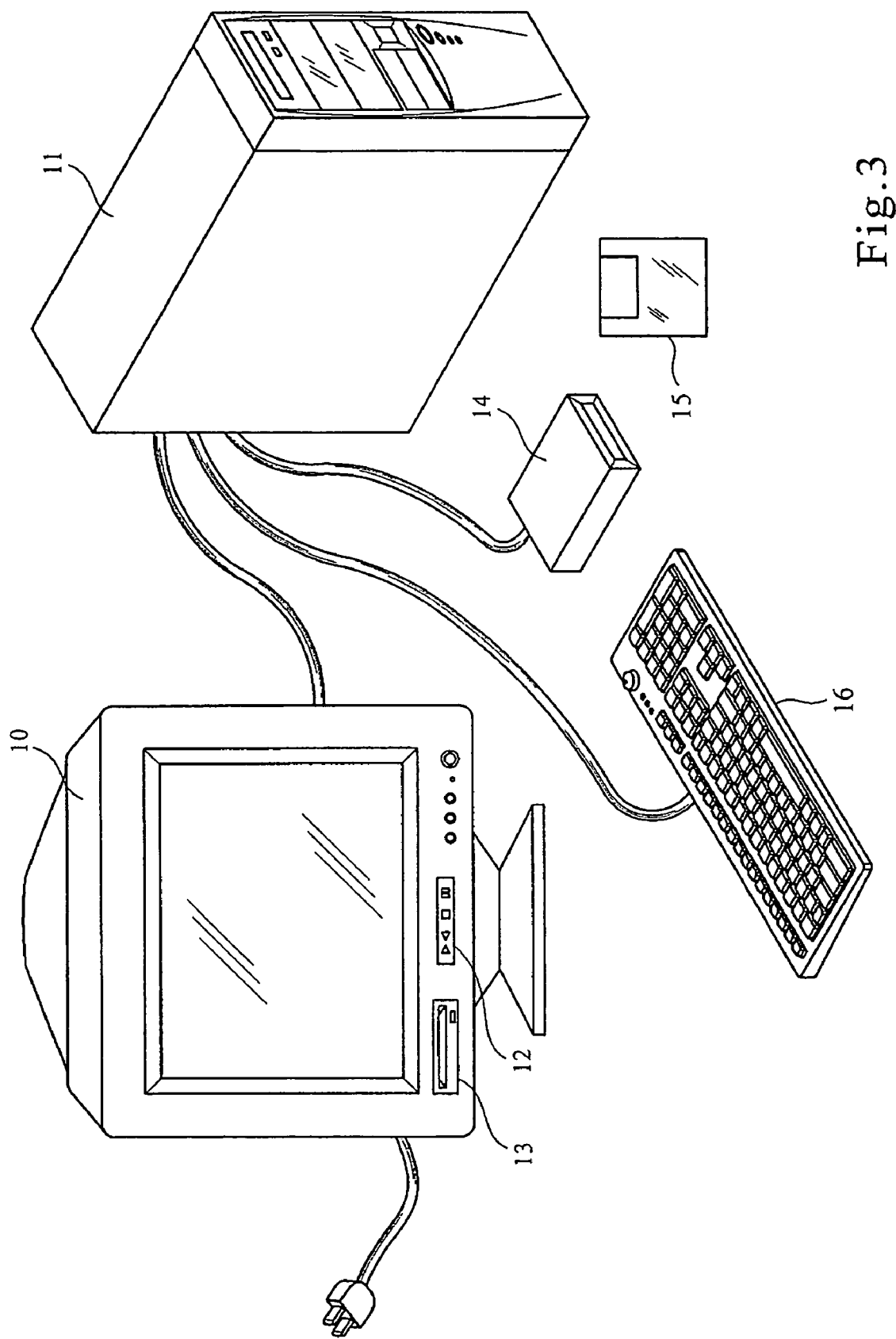
FIG. 3 is a diagram of a first embodiment of the circuit and method for digital data playing back in a displayer according to the present invention.

Referred to FIG. 3, and in connection with referring to FIG. 1 and FIG. 2, the drawing is a diagram of the first embodiment for the circuit and method for digital data playing back in a displayer according to the present invention. As shown in FIG. 3, the digital playback circuit 60 according to the present invention can be fitted into a display unit implemented in a normal CRT (Cathode Ray Tube) 10. The data inputting interface 62 of the digital playback circuit 60 can be formed with the first data inputting interface 13 with a corresponding slot in front of the displayer 10. The user interface 65 of the digital playback circuit 60 is formed as a corresponding control panel 12 in front of the displayer 10. A power supply controller (not shown) is configured at the host, and controlled by the control signal outputted from the digital playback circuit 60. The control signal is trigged by a corresponding control key, and used to select and control the power whether to be supplied to the CPU to start the computer host;

wherein, the data inputting interface 62 can also be a composite slot for reading the data from different data storage media.

In an embodiment according to the present invention, when the computer system is at the OFF state, the CPU is at the state not supplying the power, and the power can be selectively supplied to the external multiplex module (such as the second data inputting interface 14 external to the computer host or the USB interface) or the CRT displayer 10, so that the displayer 10 can enable the digital playback circuit 60 playing back the video data under the state of suspending power supply to the CPU. Furthermore, in another embodiment, the input power of the displayer 10 can also be independent to the power supply of the computer host.

When the user inserts the data storage medium 15 into the first data inputting interface 13, the video data is inputted to the digital playback circuit 60; wherein, the data storage medium may be the CF card, the SD card or the MMC, etc., for carrying different types of video/audio file; wherein, the control panel 12 has the play key, the forward key, the reverse key, the pause key, and the stop key, and these keys are functioned like the ordinary playing device to be used to control the playing operation of the digital playback circuit 60.

Thus, when the user inserts the data storage medium 15 into the first data inputting interface 13, the digital signal processor 63 of the digital playback circuit 60 can conduct further decoding/encoding processing on the received video data, and output the processed video/audio signal with the control by the control panel 12 through the signal bus 71 to the displayer 10 and/or the speaker 70 for further video/audio playing; wherein, the speaker 70 can also be embedded in the case of the displayer 10 for receiving and playing the voice signal outputted from the digital playback circuit 60.

Moreover, in the process of playing back video data in the digital playback circuit by the user, when the user completely turns on the power supplied by the computer host, the video data inputted into the displayer through the digital playback circuit 60 can also be transmitted to the computer host 11 or the storage device through the USB interface. It is worth to be further described that, although the USB interface can be used as the communication interface between the displayer and the computer host, the USB interface can also be used as the data inputting interface of the digital playback circuit. When the portable storage device with the USB interface is inserted into the USB interface of the displayer, the digital playback circuit can also playback the video/audio file on the portable storage device.

Figure 4:
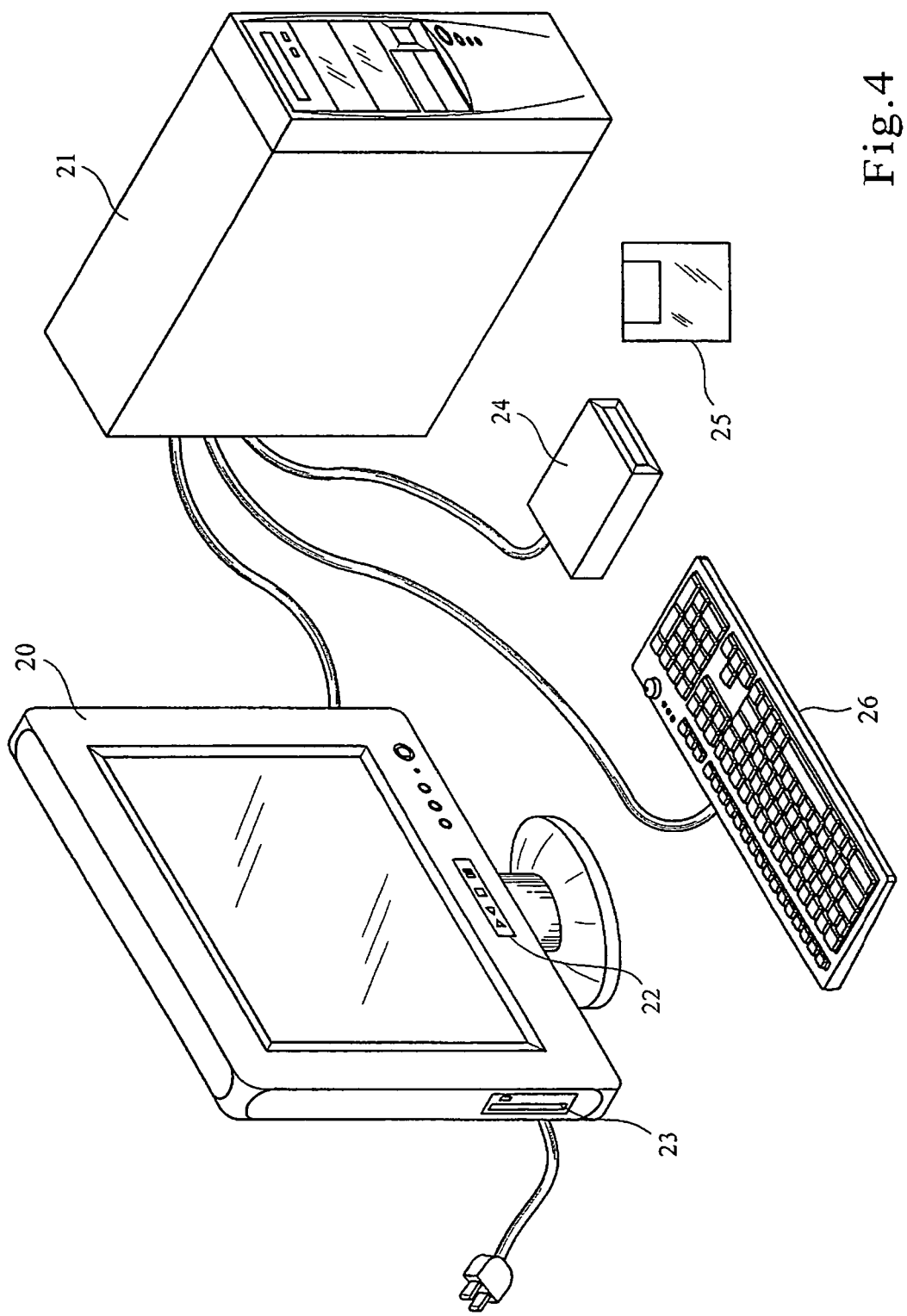
FIG. 4 is a diagram of a second embodiment of the circuit and method for digital data playing back in a displayer according to the present invention.

Referred to FIG. 4, the drawing is a diagram of the second embodiment for the circuit and method of playing back digital data in a displayer according to the present invention. As shown in FIG. 4, the digital playback circuit 60 of the displayer according to the present invention can be fitted with the display unit implemented on a Liquid Crystal Display (LCD). The data inputting interface 62 of the digital playback circuit 60 can be formed as a corresponding first data inputting interface 23 on the side of the displayer 20. The user interface 65 of the digital playback circuit 60 is formed as a corresponding control panel 22 in front of the displayer 20. A power supply controller (not shown) is configured at the host, and controlled by the control signal outputted from the digital playback circuit 60. The control signal can be triggered by a corresponding control key for selecting and controlling the power whether to be supplied to the CPU to start the computer host.

When the user inserts the data storage medium 25 into the first data inputting interface 23, the video data is inputted to the digital playback circuit 60; wherein, the data storage medium may be the CF card, the SD card, the MMC, and the like, to carry different types of video/audio file; wherein, the control panel has the play key, the forward key, the reverse key, the pause key and the stop key, and these keys are functioned like the normal playing device for controlling the playback operation of video data by the digital playback circuit 60.

Thus, when the user inserts the data storage medium 25 into the first data inputting interface 23, the digital signal processor 63 of the digital playback circuit 60 can conduct further decoding/encoding processing on the received video data, and output the processed video/audio signal with the control by the control panel 22 through the signal bus 71 to the displayer 20 and/or the speaker 70 for further video/audio playing.

Moreover, in the process of playing back video data in the digital playback circuit by the user, when the user completely turns on the power supplied by the computer host, the video data inputted into the displayer 20 through the digital playback circuit 60 can also be transmitted to the computer host 21 or the storage device through the USB interface. It is worth to be further described that, although the USB interface can be used as the communication interface between the displayer and the computer host, the USB interface can also be used as the data inputting interface of the digital playback circuit. When the portable storage device with the USB interface is inserted into the USB interface of the displayer, the digital playback circuit can also playback the video/audio file on the portable storage device.

Figure 5:
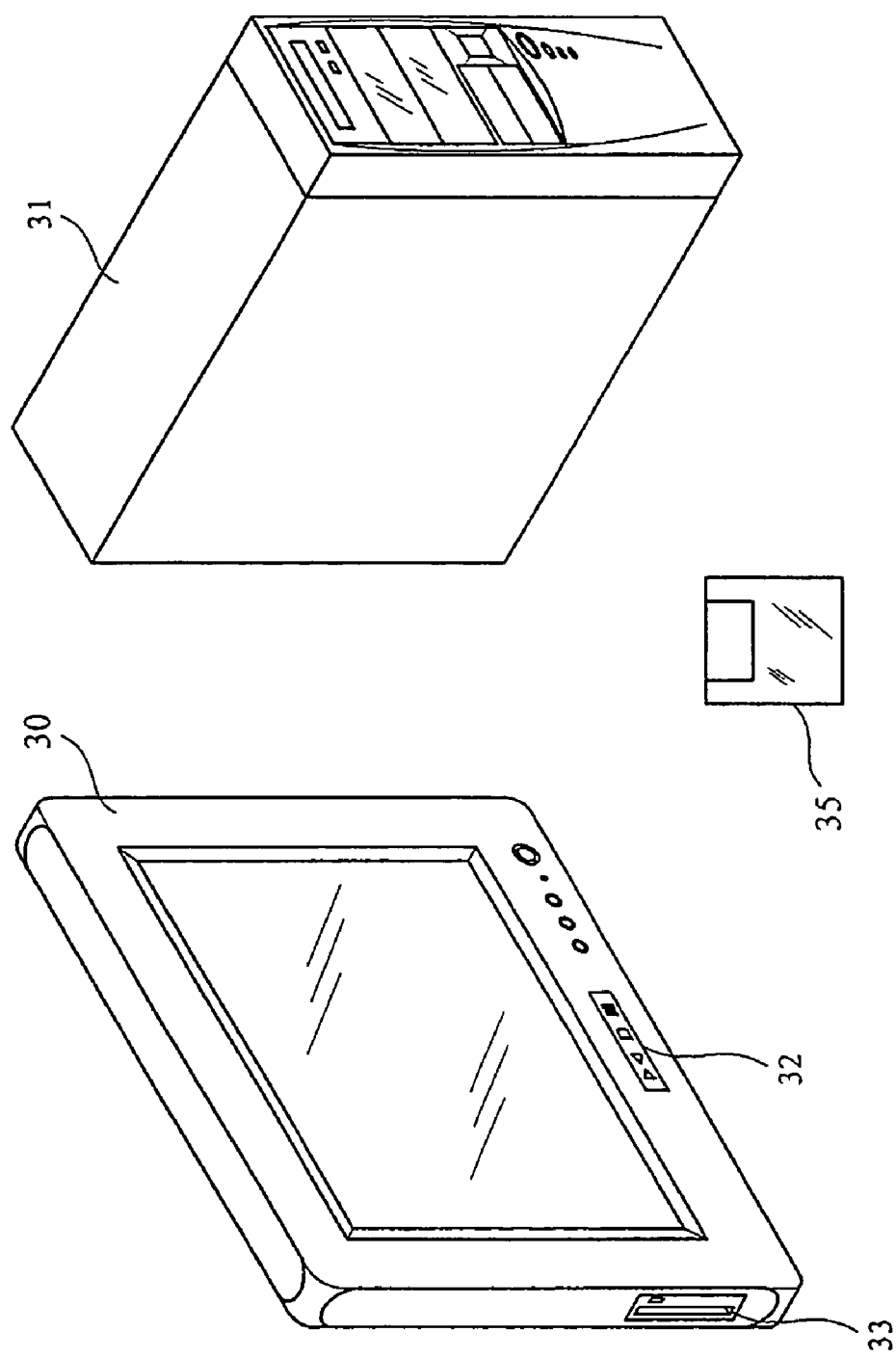
FIG. 5 is a diagram of a third embodiment of the circuit and method for digital data playing back in a displayer according to the present invention.

Referred to FIG. 5, the drawing is a diagram for the third embodiment of the circuit and method of playing back digital data in a displayer according to the present invention. The digital playback circuit 60 in a displayer according to the present invention can also be fitted into the display unit implemented by a wireless LCD displayer (Wireless Liquid Crystal Display) 30. The wireless LCD displayer has an independent power supply, such as a battery for supplying power to the digital playback circuit 60. The data inputting interface 62 of the digital playback circuit 60 can be formed with a corresponding first data inputting interface 33 on the side of the wireless LCD displayer 30. The user interface 65 of the digital playback circuit 60 can be formed as a corresponding control panel 32 in front of the wireless LCD displayer 30.

When the user inserts the data storage medium 35 into the first data inputting interface 33, the video data is inputted into the digital playback circuit; wherein, the data storage medium may be the CF card, the SD card, or the MMC, and the like, to carry different types of video/audio files. The control panel has the play key, the forward key, the reverse key, the pause key, and the stop key, and these keys are functioned like the ordinary playing device to be used to control the playing operation of the digital playback circuit 60; wherein, the wireless LCD displayer 30 has a wireless base station (not shown) used as the communication transmission interface between the computer host 31 and the wireless LCD displayer 30; in the process of playing back video data in the digital playback circuit by the user, when the user completely turns on the power supplied by the computer host, the video data is inputted into the digital playback circuit 60, and the video/audio signal can also be transmitted to the computer host 30 through the wireless base station. The wireless base station may be a wireless communication module.

Figure 6A:
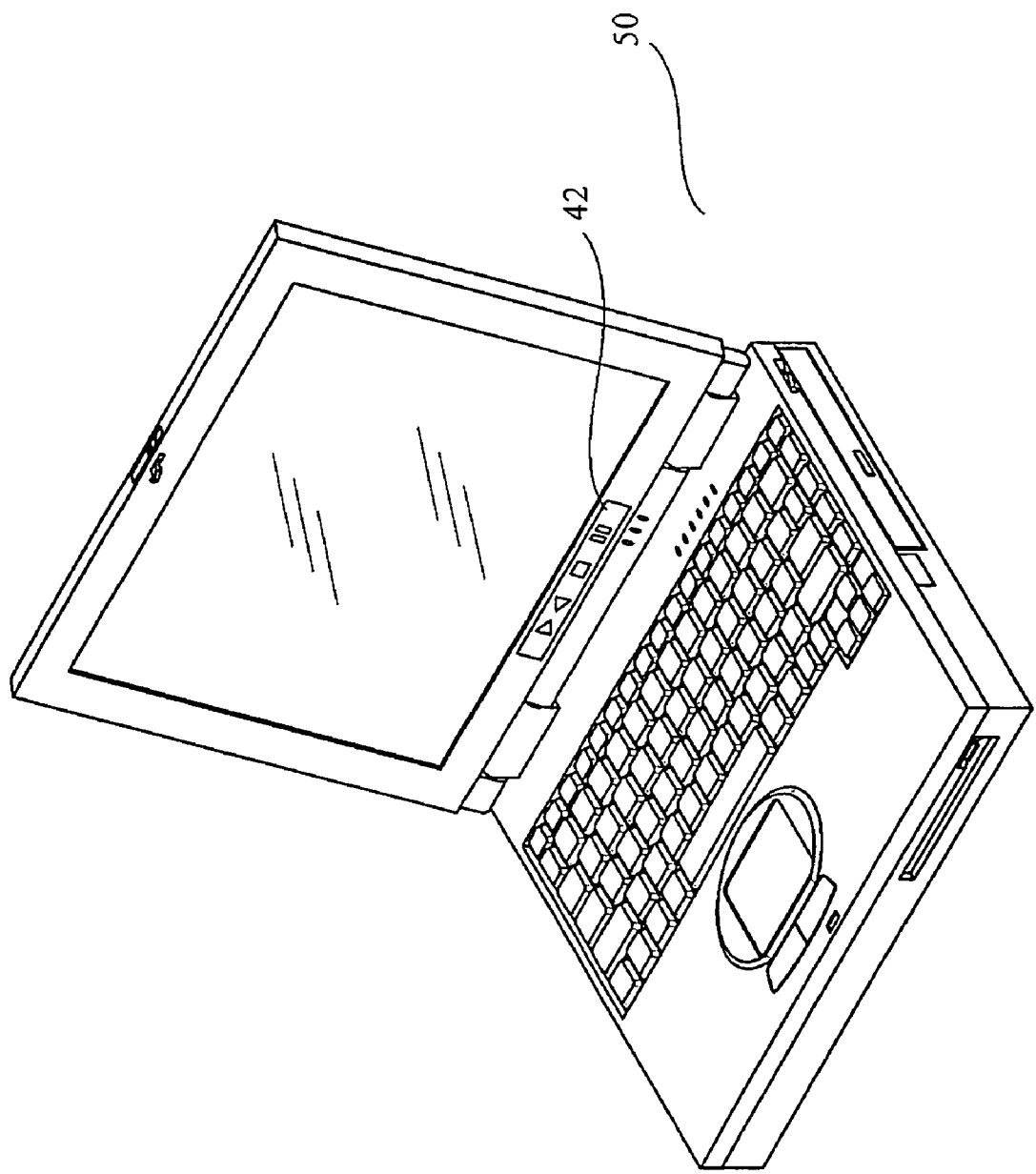
FIG. 6A and FIG. 6B are the diagrams of a fourth embodiment of the circuit and method for digital data playing back in a displayer according to the present invention.
Figure 6B:
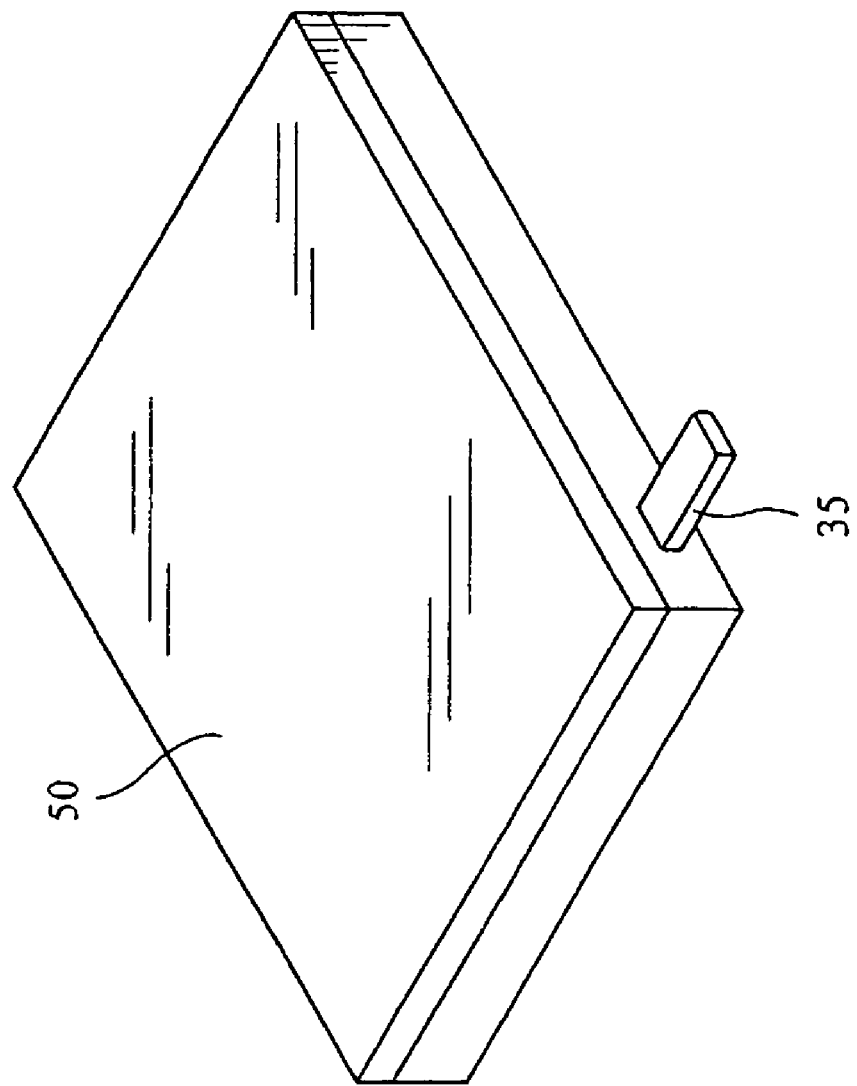

Referred to FIG. 6A and FIG. 6B, the drawings are the diagrams for the fourth embodiment of the circuit and method for playing back digital data in a displayer according to the present invention. As shown in FIG. 6A and FIG. 6B, the digital playback circuit 60 in the displayer according to the present invention can also be associated with a Note book to implement. The Note book 50 has an independent power supply, such as a battery, wherein a power supply controller (not shown) is configured in the note book, and controlled by the control signal of the digital playback circuit 60. It can be triggered by configuring a corresponding control key on the displayer or the keyboard, for selecting and controlling the power whether to be supplied to the CPU to start the computer system.

The USB interface of the Note book 50 may be the data inputting interface 62 of the digital playback circuit 60, as shown in FIG. 6. The user interface 65 of the digital playback circuit 60 is formed as a corresponding control panel 42 in front of the display of the Note book. The user operates the play key, the forward key, the reverse key, the pause key or the stop key on the control panel to directly control the playing back operation of the video data on the digital playback circuit 60.

When the user inserts the data storage medium 35 into the USB interface at the rear, the video data will be inputted to the digital playback circuit 60. In this embodiment, the Note book 50 may be configured with a video/audio start key, which is different from the system power key for turning on the Note book 50 (including supplying power to CPU). The video/audio start key may trigger enough power supply to enable the digital playback circuit 60 and the LCD displayer to be able to play back the video data.

The circuit and method of playing back digital data in a displayer according to the present invention is used to reduce the power consumption of the computer host. By configuring a digital playback circuit on the displayer, the video data can be directly played back through the displayer. Thus, even the computer host is at OFF state, the displayer can be operated itself to playback the digital video data. Therefore, the user can obtain different playback interfaces to reduce the power consumption of the computer host, and minimize the possible loss of computer working time.

The invention claimed is:

1. A circuit for playing back digital data in a LCD displayer of a computer system comprising a CPU, comprising:
 a data inputting interface for reading video data stored in a memory module;
 a digital signal processor, connected to the data inputting interface, for decoding/encoding the video data and generating a corresponding video signal;
 a signal bus for outputting the video signal to a display unit; and,
 a user interface having a video/audio start key, connected to the digital signal processor, for controlling the digital signal processor to generate the playback of the video signal and said video/audio start key triggers a power supply to supply enough power to enable the digital signal processor and the display unit to play back the digital data while the CPU is not energized.

2. The circuit for playing back digital data in a LCD displayer of claim 1, further includes a read only memory, connected to the input of the digital signal processor, for storing a driver program of the digital signal processor.

3. The circuit for playing back digital data in a LCD displayer of claim 1, further includes a SDRAM as the access medium for the video data after encoding/decoding by the digital signal processor.

4. The circuit for playing back digital data in a LCD displayer of claim 1, wherein the signal bus can be connected to the multiplex interface module, such as an USB interface or a speaker.

5. The circuit for playing back digital data in a LCD displayer of claim 1, wherein the circuit is connected to a power supply controller, and the power supply controller is configured at the computer system, and controlled by a control signal outputted from the digital signal processor for controlling a power whether to be supplied to a CPU to start the computer system.

6. The circuit for playing back digital data in a LCD displayer of claim 5, wherein the control signal is triggered by a control key configured on the user interface.

7. The circuit for playing back digital data in a LCD displayer of claim 1, wherein the data inputting interface is a card reader.

8. The circuit for playing back digital data in a LCD displayer of claim 1, wherein the signal bus is an AV terminal wire.

9. The circuit for playing back digital data in a LCD displayer of claim 1, wherein the user interface is a control panel.

10. The circuit for playing back digital data in a LCD displayer of claim 9, wherein the control panel includes a play key, a pause key, and a stop key.

11. The circuit for playing back digital data in a LCD displayer of claim 1, wherein the memory module is a data storage medium, such as the CF card, the SD (Secured digital) card, or the MMC (Multi Media Card).

12. The circuit for playing back digital data in a LCD displayer of claim 1, wherein the data inputting interface is a slot for reading the data from different data storage media.

13. A computer system for playing back digital video data, comprising:
 a computer host, comprising a CPU;
 a display unit;
 a digital playback circuit, including a data inputting interface and a digital signal processor, in which the digital signal processor reads the digital data stored in a memory module from the data inputting interface, and decodes/encodes the digital data to correspondingly generate a video signal; and,
 a power supply controller, for supplying a power to the display unit and the digital playback circuit to enable the digital signal processor and the display unit to play back the digital data at the state of which the CPU is not energized and the video signal is transmitted to the display unit.

14. A wireless displayer used for a wireless computer system, comprising:
 a wireless communication module for communicating with a wireless computer host;
 a display unit;
 a data inputting interface for accessing video data stored in a storage device;
 a digital playback circuit having a digital signal processor, in which the digital signal processor reads the video data from the data inputting interface, and decodes/encodes the video data to correspondingly generate a video signal to the display unit at the state of which a CPU of the wireless computer system is not energized; and, a user interface having a video/audio start key, for controlling the digital playback circuit to generate the video signal for playing back operation wherein said video/audio start key triggers a power supply to supply enough power to enable the digital signal processor and the display unit to play back the video data.

* * * * *